United States Patent [19]

Hagiwara et al.

[11] Patent Number: 5,283,419
[45] Date of Patent: Feb. 1, 1994

[54] ARC WELDING MACHINE AND METHOD

[75] Inventors: Seigo Hagiwara; Hidetoshi Ooyama, both of Kawanishi; Akihiko Kitajima, Sanda, all of Japan

[73] Assignee: Matsushita Electric Industrial Co., Ltd., Osaka, Japan

[21] Appl. No.: 890,573

[22] Filed: May 28, 1992

[30] Foreign Application Priority Data

May 31, 1991 [JP] Japan .................................. 3-128995
Jun. 10, 1991 [JP] Japan .................................. 3-137640

[51] Int. Cl.$^5$ .............................................. B23K 9/09
[52] U.S. Cl. ........................... 219/137 PS; 219/130.51
[58] Field of Search ...................... 219/130.51, 137 PS, 219/130.5

[56] References Cited

U.S. PATENT DOCUMENTS 4,876,433 10/1989 Kashima et al. .

OTHER PUBLICATIONS

Abstract-Patent Abstracts of Japan, vol. 011, No. 255 (M617) 19 Aug. 1987, & JP-A-62 061 799 (Toyota Motor Corp.) 18 Mar. 1987.

European Search Report for European Patent Application 92108831.6.

Primary Examiner—Clifford C. Shaw
Attorney, Agent, or Firm—Ratner & Prestia

[57] ABSTRACT

An arc welding machine includes a transformer a diode for rectification connected to the secondary winding of the transformer, two capacitors connected in series with each other and in parallel with the diode, and the first and second switching elements connected in series with each other and in parallel with the diode. This machine also includes an electrode having one end connected at a location intermediately of the two switching elements and the other end opposed to an object to be welded, first and second drive circuits connected to the first and second switching elements, respectively, an oscillating circuit for determining the width of pulses of the first and second drive circuits, and a timer circuit for inputting to the oscillating circuit signals required to make the oscillating circuit periodically repeat oscillating and stop operations. The object is connected at a location intermediately of the two capacitors. The second drive circuit outputs inverted signals of the first drive circuit. By this construction, an alternating current and a direct current alternately flow between the electrode and the object during welding.

3 Claims, 3 Drawing Sheets

ARC WELDING MACHINE AND METHOD

BACKGROUND OF THE INVENTION

1. Field of the Invention

The present invention relates generally to an arc welding method suited for factory automation, and more particularly to an arc welding method suited for use in welding a material such as, for example, aluminum or magnesium, which requires the removal of an oxide layer during welding. The present invention also relates to an arc welding machine for effecting this method.

2. Description of the Prior Art

FIG. 1 schematically depicts a conventional arc welding machine for effecting arc welding processes in an inert gas (not shown) with an alternating current being supplied from a power supply system 4 so as to flow between an electrode 1 and an object 3 to be welded. In a period represented by $T_{ED}$, the electrode 1 is negative whereas the object 3 is positive. This period is characterized in that the penetration is deep, the rate of consumption of the electrode 1 is small, and arc sounds are small, as shown in Table 1.

On the other hand, in a period represented by $T_{EF}$, the electrode 1 is positive whereas the object 3 is negative. When the material of a base is aluminum, magnesium or the like, an oxide obstructs welding. The reason for this is that the melting point of the oxide is higher than that of the base. The period $T_{EP}$ is characterized by an oxide removal action.

TABLE 1

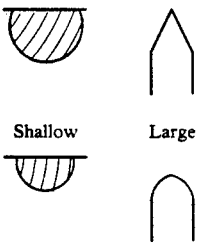

| | Oxide Layer Removal Action | Penetration | Consumption of Electrode | Arc Sound |
|---|---|---|---|---|
| $T_{EN}$ | No | Deep | Small | Small |
| $T_{EP}$ | Yes | Shallow | Large | Large |

As described above, in applications where the melting point of an oxide is higher than that of a base, welding is performed by the use of an alternating current with $T_{EN}$ and $T_{EP}$ being alternated. In general, the alternating current required for the welding has a frequency of about 100 Hz, and the magnitude thereof is slightly greater during $T_{EN}$ than during $T_{EP}$.

However, this kind of conventional arc welding method employing an alternating current during welding is not suited for use in fillet welding or Uranami welding (penetration welding) because the directivity of arcs is not stable. Furthermore, higher harmonics caused by the inversion enlarges arc sounds, and the electrode heating action during $T_{EN}$ results in rapid consumption of the electrode.

SUMMARY OF THE INVENTION

The present invention has been developed to overcome the above-described disadvantages.

It is accordingly an object of the present invention to provide an improved arc welding machine and method which is superior in the directivity of arcs and can obtain deep penetration.

Another object of the present invention is to provide an arc welding machine and method of the abovedescribed type which can reduce the rate of consumption of an electrode and arc sounds.

In accomplishing these and other objects, an arc welding method according to the present invention comprising the steps of: producing an alternating current; periodically converting the alternating current to a direct current; and alternately applying the alternating current and the direct current to an object to be welded. The frequency of alternation of the alternating current and the direct current is rendered to be 0.5–10 Hz whereas the ratio of periods during which the alternating current flows through the object is rendered to be 30–80%.

In order to effect the above-described method, an arc welding machine according to the present invention comprises a transformer having a primary winding and a secondary winding, a rectification means connected to the secondary winding of the transformer, two capacitors connected in series with each other and in parallel with the rectification means, and first and second switching elements connected in series with each other and in parallel with the rectification means. This machine further comprises an electrode having one end connected at a location intermediately of the two switching elements and the other end opposed to an object to be welded, a first drive means connected to the first switching element, a second drive means connected to the second switching element, an oscillating means for determining the width of pulses of the first and second drive means, and a timer means for inputting to the oscillating means signals required to make the oscillating means periodically repeat oscillating and stop operations. The second drive means outputs inverted signals of the first drive means. The object to be welded is connected at a location intermediately of the two capacitors.

By the above-described construction, an alternating current and a direct current alternately flow between the electrode and the object during welding.

Preferably, the arc welding machine also comprises a pulse-width regulating means for regulating the width of pulses of the oscillating means.

According to the present invention, because the effect of the direct current is added to that of the alternating current, the pole at a hot-cathode is rendered to be stable, thereby enhancing the directivity of arcs and producing the cooling effect of the electrode. Furthermore, because the number of inversion of the electric current is small, arc sounds are relatively small. Also, the alternation of the alternating current and the direct current produces nicelooking wavelike beads because the features of the former are wide beads and shallow penetration whereas those of the latter are narrow beads and deep penetration.

BRIEF DESCRIPTION OF THE DRAWINGS

These and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 1:
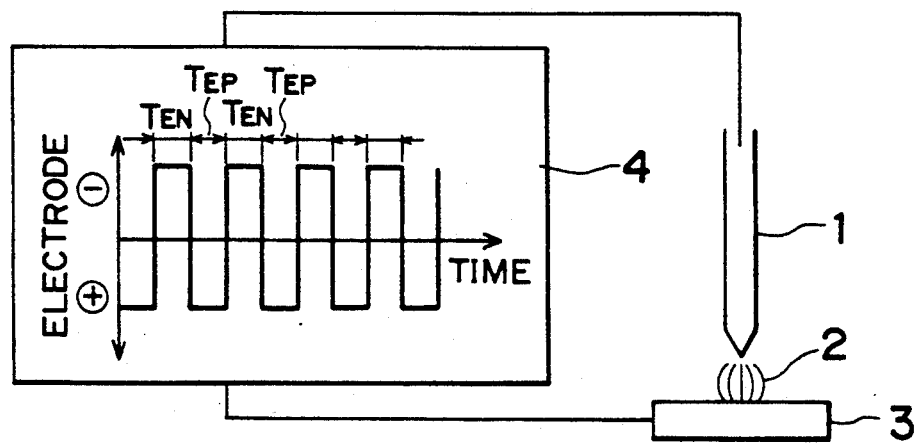
FIG. 1 is a schematic view of an arc welding machine for effecting the conventional arc welding method.
Figure 2:
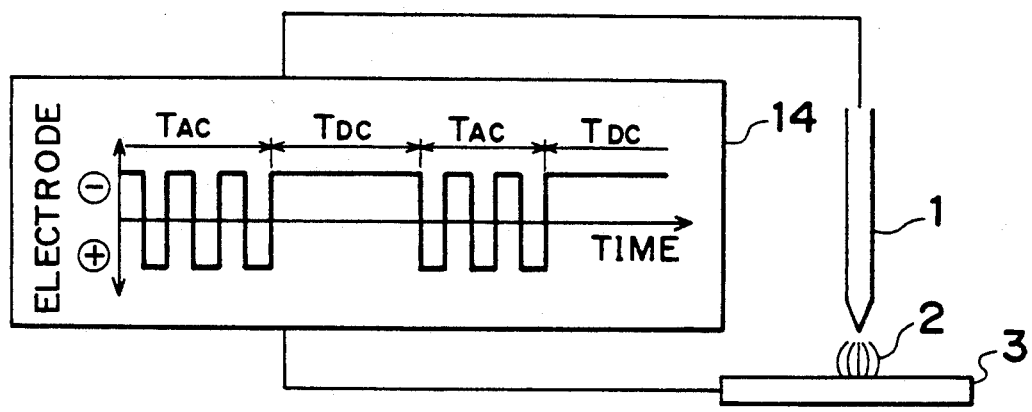
FIG. 2 is a schematic view of an arc welding machine according to the present invention.
Figure 3:
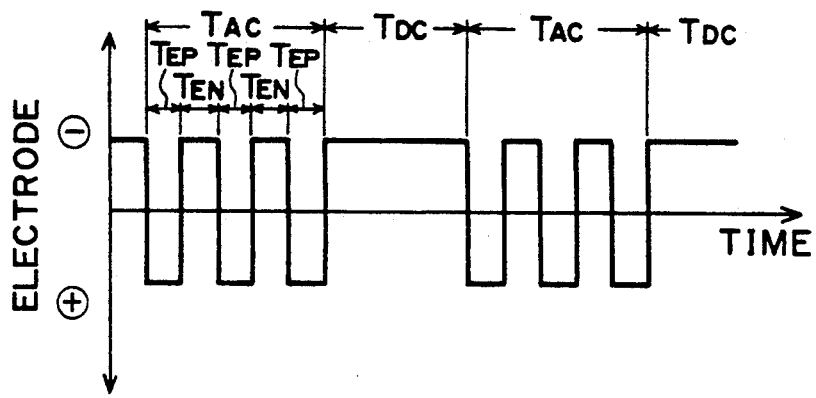
FIG. 3 is a waveform diagram indicative of output pulses from a power supply system.

FIG. 2 schematically depicts an arc welding machine according to the present invention. This machine is provided with a power supply system 14, which produces a waveform different from that of the conventional power supply system 4 shown in FIG. 1. The power supply system 14 alternately supplies an alternating current and a direct current during a period represented by $T_{AC}$ and during a period represented by $T_{DC}$, respectively, as shown in FIG. 3.

The ratio of the period of the alternating current and the frequency of alternation of the alternating current and the direct current are expressed by:

$$T_{AC}/(T_{AC}+T_{DC})\times 100, \text{ and}$$

$$1/(T_{AC}+T_{DC}), \text{ respectively}.$$

The relationship among the width of beads the width of cleaning, the depth of beads, and the rate of consumption of an electrode 1 was investigated with the ratio of the period of the alternating current and the frequency of alternation of the alternating current and the direct current being changed. The width of cleaning is the width of that portion of an object 3 to be welded from which an oxide layer has been removed.

Figure 4:
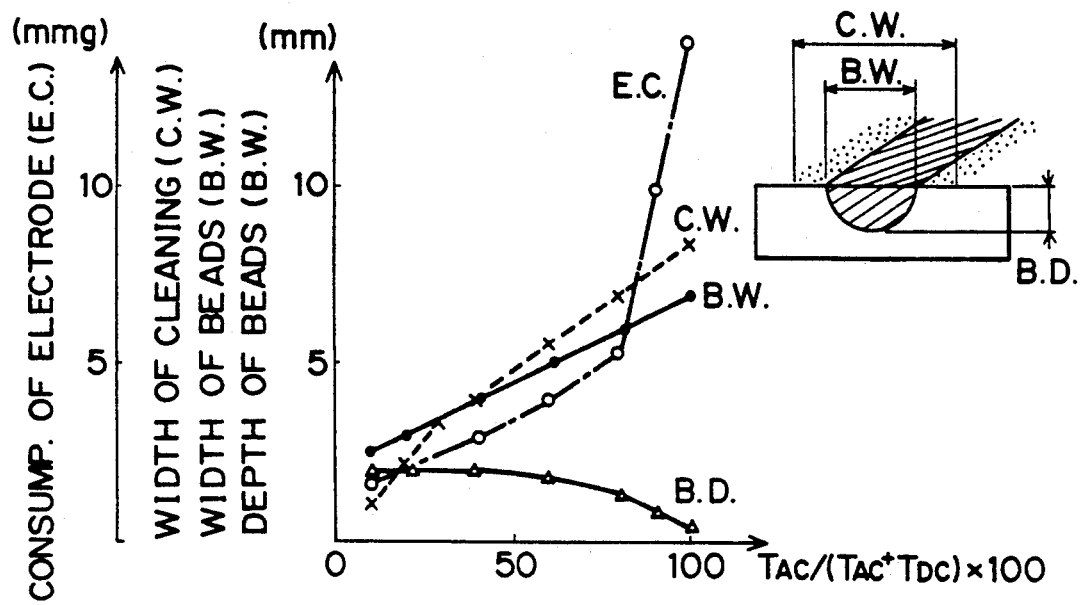
FIG. 4 is a graph indicative of the relationship between the ratio of the period of an alternating current and several performance factors.

FIG. 4 is a graph obtained as a result of experiments in which the speed of welding and the frequency of the alternating current were set to 30 cm/min and 100 Hz, respectively, with an electric current of 200 amperes being applied to an aluminum plate of 6 mm thick.

With the increase of the ratio of the period of the alternating current, both the width of cleaning and the width of beads become wide whereas the depth of beads becomes shallow. On the other hand, the rate of consumption of the electrode 1 increases. In view of this fact, the lower limit and the upper limit in the ratio of the period of the alternating current were respectively set to 30% above which the width of cleaning is wider than the width of beads and to 80% below which the increase in the rate of consumption of the electrode 1 is small and the depth of beads is not so shallow.

Figure 5:
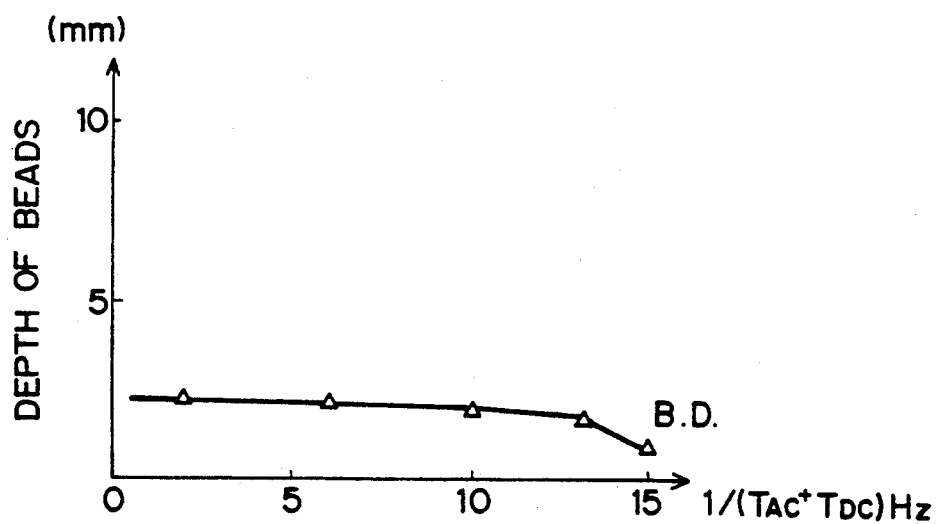
FIG. 5 is a graph indicative of the relationship between the frequency of alternation and the depth of beads.

FIG. 5 is a graph indicative of the relationship between the depth of beads and the frequency of alternation of the alternating current and the direct current. Similar to the experimental conditions set to obtain the result shown in FIG. 4, welding was performed at a speed of 30 cm/min with an electric current of 200 amperes being applied to an aluminum plate of 6 mm thick. The ratio of the period of the alternating current was set to 50%.

Figure 6:
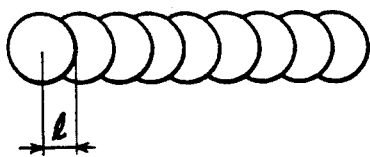
FIG. 6 is a schematic view indicative of the external appearance of the beads.

When the frequency of alternation is below 10 Hz, the beads present a wavelike external appearance, as shown in FIG. 6. When the distance between two adjoining waves and the speed of welding are rendered to be l and V, respectively, a relationship expressed by the following formula establishes.

$$l = V \times (T_{AC}+T_{DC})$$

Accordingly, if the frequency of alternation is increased, the pitch of waves becomes narrow. In general, V=30 cm/min. Accordingly, if the frequency of alternation is greater than 10 Hz i.e., if $1/(T_{AC}+T_{DC})>10$ Hz, l=0.5 mm, and therefore, it is considerably difficult to obtain wavelike beads.

Figure 7:
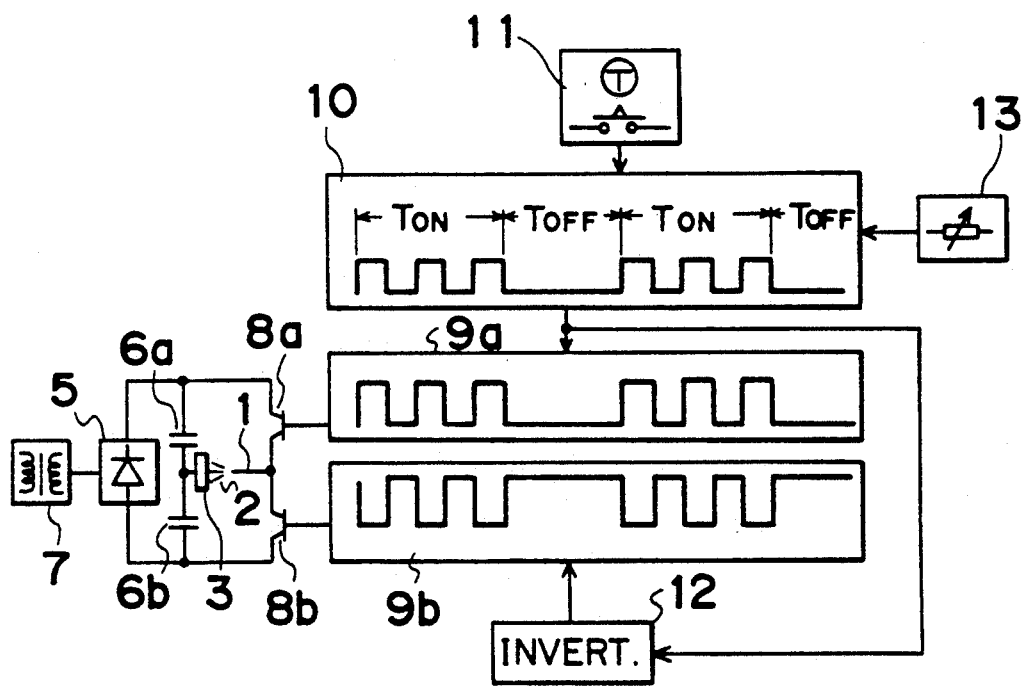
FIG. 7 is a circuit diagram of the arc welding machine according to the present invention.

FIG. 7 is a circuit diagram embodying an arc welding machine according to the present invention. This circuit includes a transformer 7 having a primary winding and a secondary winding, a diode 5 for rectification connected to the secondary winding of the transformer 7, two capacitors 6a and 6b connected in series with each other and in parallel with the diode 5, and two switching elements 8a and 8b connected in series with each other and in parallel with the diode 5. The switching elements 8a and 8b are connected with respective drive circuits 9a and 9b. The drive circuit 9a is directly connected with an oscillating circuit 10 so that output pulses from the oscillating circuit 10 may be inputted thereinto. On the other hand, the drive circuit 9b is connected with the oscillating circuit 10 via an invertor 12 so that the output pulses from the oscillating circuit 10 may be inverted in polarity by the invertor 12 prior to the input thereof into the drive circuit 9b. The oscillating circuit 10 determines the period of pulses of the drive circuits 9a and 9b. To the oscillating circuit 10 are connected a timer circuit 11 periodically repeating ON and OFF and a pulse-width regulating circuit 13 for regulating the width of pulses generated by the oscillating circuit 10. A load for welding i.e., an object 3 to be welded is connected at a location intermediately of the two capacitors 6a and 6b whereas one end of an electrode 1 is connected at a location intermediately of the two switching elements 8a and 8b. The other end of the electrode 1 is opposed to the object 3 so that arcs 2 may be generated during welding.

The oscillating circuit 10 is operable in association with the operation of the timer circuit 11. When the timer circuit 11 is ON, the oscillating circuit 10 oscillates. In contrast, when the timer circuit 11 is OFF, the oscillating circuit 10 stops oscillations. The timer circuit 11 and the oscillating circuit 10 repeat such operations.

When the timer circuit 11 is ON, the drive circuits 9a and 9b output signals to the switching elements 8a and 8b, respectively, based on signals outputted from the oscillating circuit 10, thereby alternately turning on and off the switching elements 8a and 8b. In this way, the alternating current flows during the period $T_{AC}$, as shown in FIG. 3. In contrast, when the timer circuit 11 is OFF, the oscillating circuit 10 stops oscillations. Thereafter, the switching element 8a is kept on whereas the switching element 8b is kept off. Accordingly, the electric current flows in the direction of capacitor 6a - object 3 - arc load 2→electrode 1→switching element 8b. This means that the direct current flows during the period $T_{DC}$ with the electrode 1 being negative, as shown in FIG. 3.

As described above, according to the present invention, the alternating current and the direct current alternately flow in compliance with ON and OFF of the timer circuit 11. Accordingly, the ratio of the period of the direct current ($=T_{OFF}/(T_{ON}+T_{OFF})=T_{DC}/(T_{AC}+T_{DC})$) can be freely selected in accordance with the setting of the time period of the timer circuit 11.

Even if the ratio of the period of the direct current is fixed, the width of pulses can be narrowed during the oscillating operations of the oscillating circuit 10 by the operation of the pulse-width regulating circuit 13. By doing so, the width of pulses of the drive circuit 9a can be narrowed whereas that of the drive circuit 9b can be widened. Accordingly, because the ON-period of the switching element 8b is extended, the ratio of the period during which the electrode 1 is negative is enlarged, as similar to the case where the ratio of the period of the direct current is enlarged. As a result, the ratio of the period of hot-cathode discharge becomes large, and the directivity and the stability of arcs are enhanced. Also, the electrode heating effect becomes small, thereby restraining the rate of consumption of the electrode 1.

As is clear from the above, the arc welding method according to the present invention utilizes the welding current periodically alternating the period of the alternating current and that of the direct current. In this method, the frequency of alternation and the ratio of the period of the alternating current are rendered to be 0.5-10 Hz and 30-80%, respectively. Because the directivity of arcs are enhanced, this method is suited for use in fillet welding or Uranami welding. Furthermore, the rate of consumption of the electrode and arc sounds are relatively small. In addition, beads present a nicelooking wavelike external appearance. Because of these reasons, the method according to the present invention is suitable for factory automation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An arc welding method comprising the steps of:

producing an alternating current;
periodically converting said alternating current to a direct current; and
alternately applying said alternating current and said direct current to an object to be welded;
wherein the frequency of alternation of said alternating current and said direct current is rendered to be 0.5-10 Hz and wherein the ratio of periods during which said alternating current flows through said object is rendered to be 30-80%.

2. An arc welding machine comprising:

a transformer having a primary winding and a secondary winding;
a rectification means connected to said secondary winding of said transformer;
two capacitors connected in series with each other and in parallel with said rectification means;
first and second switching elements connected in series with each other and in parallel with said rectification means;
an electrode having one end connected at a location intermediately of said two switching elements and the other end adapted to be opposed to an object to be welded, said object being connected at a location intermediately of said two capacitors;
a first drive means, connected to said first switching element, for driving said first switching element;
a second drive means, connected to said second switching element, for driving said second switching element, said second drive means outputting inverted signals of said first drive means;
an oscillating means for determining the width of pulses of said first and second drive means; and
a timer means for inputting to said oscillating means signals required to make said oscillating means periodically repeat oscillating and stop operations, whereby an alternating current and a direct current alternately flow between said electrode and said object during welding.

3. The arc welding machine according to claim 2 further comprising a pulse-width regulating means for regulating the width of pulses of said oscillating means.

* * * * *